(12) United States Patent
Barnes et al.

(10) Patent No.: US 11,858,215 B2
(45) Date of Patent: Jan. 2, 2024

(54) BUILD MATERIAL HEATERS WITH BAFFLES

(71) Applicant: HEWLETT-PACKARD DEVELOPMENT COMPANY, L.P., Spring, TX (US)

(72) Inventors: Arthur H. Barnes, Vancouver, WA (US); William Winters, Vancouver, WA (US); Stephan Clark, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 54 days.

(21) Appl. No.: 16/607,732

(22) PCT Filed: Apr. 30, 2018

(86) PCT No.: PCT/US2018/030200
§ 371 (c)(1),
(2) Date: Oct. 24, 2019

(87) PCT Pub. No.: WO2019/212484
PCT Pub. Date: Nov. 7, 2019

(65) Prior Publication Data
US 2021/0370598 A1  Dec. 2, 2021

(51) Int. Cl.
*B29C 64/295* (2017.01)
*B33Y 30/00* (2015.01)
*B33Y 40/00* (2020.01)

(52) U.S. Cl.
CPC ............ *B29C 64/295* (2017.08); *B33Y 30/00* (2014.12); *B33Y 40/00* (2014.12)

(58) Field of Classification Search
CPC .............................. B29C 64/295; B33Y 30/00
USPC ......................................................... 425/174
See application file for complete search history.

(56) References Cited

U.S. PATENT DOCUMENTS

| 6,391,251 | B1 | 5/2002 | Keicher et al. |
| 9,403,235 | B2 | 8/2016 | Buller et al. |
| 2007/0237490 | A1* | 10/2007 | Reininger ............... G02B 6/06 385/147 |
| 2008/0124475 | A1 | 5/2008 | Kritchman |
| 2012/0164022 | A1 | 6/2012 | Muginstein et al. |
| 2013/0308328 | A1* | 11/2013 | Rice .................... F21S 41/365 362/516 |
| 2016/0243619 | A1* | 8/2016 | Gothait ................ B28B 1/001 |
| 2016/0263823 | A1 | 9/2016 | Espiau et al. |
| 2017/0072632 | A1 | 3/2017 | Page et al. |

(Continued)

FOREIGN PATENT DOCUMENTS

| CN | 104690965 A | 6/2015 |
| CN | 105014976 A | 11/2015 |

(Continued)

*Primary Examiner* — Joseph S Del Sole
*Assistant Examiner* — Xinwen Ye
(74) *Attorney, Agent, or Firm* — Shook, Hardy & Bacon L.L.P.

(57) ABSTRACT

In some examples, a printer includes a feed mechanism to distribute a build material on a platform and a heater. The heater includes a lamp, a reflector, and a radiant energy absorbing baffle located between the lamp and the reflector. The lamp and the reflector are to direct radiant energy toward the platform, and the radiant energy is to heat the build material.

15 Claims, 6 Drawing Sheets

(56) References Cited

U.S. PATENT DOCUMENTS

| | | | |
|---|---|---|---|
| 2017/0165754 A1 | 6/2017 | Buller et al. | |
| 2017/0232694 A1 | 8/2017 | Yu | |
| 2017/0239721 A1 | 8/2017 | Buller et al. | |
| 2017/0334131 A1 * | 11/2017 | Kritchman | B33Y 40/00 |

FOREIGN PATENT DOCUMENTS

| | | | | |
|---|---|---|---|---|
| CN | 106041080 A | 10/2016 | | |
| CN | 106608048 A | 5/2017 | | |
| CN | 206139838 U | 5/2017 | | |
| EP | 999036 A1 * | 5/2000 | | B29C 67/0081 |
| WO | WO1995035402 A1 | 12/1995 | | |
| WO | WO-2015056230 A1 * | 4/2015 | | B22F 10/00 |
| WO | 2017/131764 A1 | 8/2017 | | |
| WO | WO2017196333 A1 | 11/2017 | | |
| WO | WO2017210490 A1 | 12/2017 | | |
| WO | WO-2018140218 A1 * | 8/2018 | | B29C 64/129 |

\* cited by examiner

BUILD MATERIAL HEATERS WITH BAFFLES

BACKGROUND

A 3D printer commonly includes a receiving platform, a feed mechanism to distribute a build material on to the receiving platform, and a heater to soften, melt, or fuse portions of the build material, in some cases with the aid of a fusing agent.

BRIEF DESCRIPTION OF THE DRAWINGS

Various examples are described below referring to the following figures.

DETAILED DESCRIPTION

Figure 1:
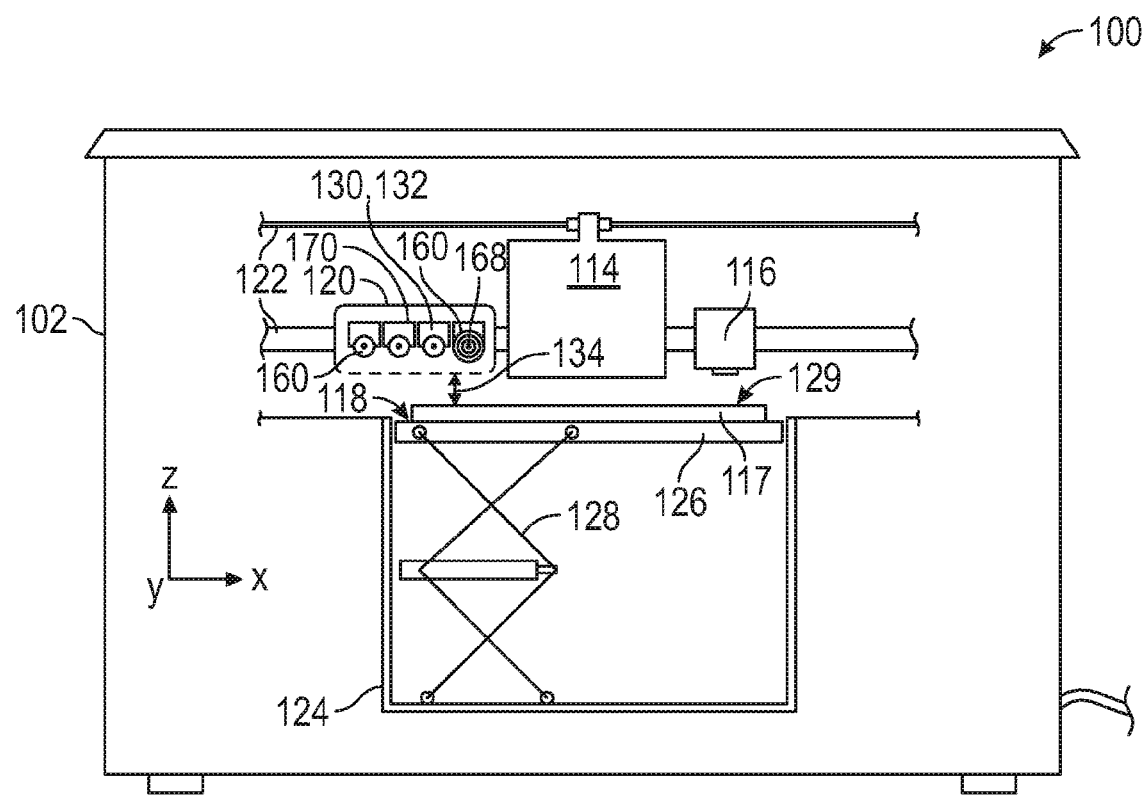
FIG. 1 shows a front view of a printer that includes a heater in accordance with various examples.

In the figures, certain features and components disclosed herein may be shown exaggerated in scale or in somewhat schematic form, and some details of certain elements may not be shown in the interest of clarity and conciseness. In some of the figures, in order to improve clarity and conciseness, one or more components or aspects of a component may be omitted or may not have reference numerals identifying the features or components.

In the following discussion and in the claims, the terms "including" and "comprising" are used in an open-ended fashion, and thus should be interpreted to mean "including, but not limited to . . . ." Also, the term "couple" or "couples" is intended to be broad enough to encompass both indirect and direct connections. Thus, if a first device couples to a second device, that connection may be through a direct connection or through an indirect connection via other devices, components, and connections. In addition, as used herein, the terms "axial" and "axially" generally refer to positions along or parallel to a central or longitudinal axis (e.g., central axis of a body or a port), while the terms "lateral" and "laterally" generally refer to positions or items located or spaced to the side of the central or longitudinal axis.

As used herein, including in the claims, the word "or" is used in an inclusive manner. For example, "A or B" means any of the following: "A" alone, "B" alone, or both "A" and "B."

In various examples, a 3D printer includes a receiving platform, a feed mechanism to distribute a build material on to the receiving platform, and a radiant heater to soften, melt, or fuse portions of the build material, which is aided in some examples by application of a fusing agent. The build material may be, as examples, a polymer, a metal, or a ceramic. The build material that is to be used may be, as examples, powdered or granular. Some of the 3D printers that use a powdered build material also include a print head with nozzles to apply liquid on the build material. In these printers, the feed mechanism periodically distributes a horizontal layer of the build material from a reservoir on to the platform, forming a layer of build material on the receiving platform. The print head moves over the receiving platform and its nozzles spray an energy absorbing fusing agent, a colorant, or another liquid in a selected pattern across the layer of the build material on the platform. The selected spray pattern for the liquid may be based on data derived from a 3D model of an object that is to be built on the printer. The heater radiates energy to the deposited build material to bond/fuse those portions on which the fusing agent has been printed; whereas, portions that lack fusing agent do not heat sufficiently to fuse. The heater may include a lamp mounted in front of a reflector, and the lamp may emit light that includes infrared and/or visible light, as examples. The heater may be stationary or may move relative to the platform and the build material thereon. The movement of the heater may be synchronized with the movement of the feed mechanism or the movement of the print head.

During heating, portions of the radiant energy from the heater may be reflected by the build material rather than being absorbed by the build material on the platform. Radiant energy may also be reflected by the platform or other features in the printer. In some examples, the problem of reflection from the build material is more likely where fusing agent is not present on the build material. In some situations, the reflected energy returns to the heater and is re-reflected by the reflector, returning to another portion of the build material. This process is known as multi-scattering. The result is a variable irradiance magnitude on the build platform that is dependent on the location and size of the fusing areas on the build platform at any given time. This creates differing irradiance values from build layer to build layer and from region to region on the same build layer resulting in increased irradiance received by various regions of the build material and unintentional, non-uniform heating or fusing of the build powder.

To reduce the multi-scattering effect, a radiant barrier including energy absorbing baffles is installed in the heater. Some examples of such baffles include thin plates or sheets of material having a dark or flat color and placed at an appropriate location relative to the lamp. In some examples, the baffles include a plate or sheet of mica coated with high temperature optical black paint. Other materials are used in some baffles. In some examples, the baffles are disposed between the lamp and the reflector. A baffle may be located behind the lamp or alongside the lamp. In some heaters, the lamp is elongated and extends along a filament axis, parallel to the receiving platform. For an example, it is assumed that the filament axis is horizontal. Some examples include an arcuate baffle positioned vertically, perpendicular to the filament axis. Some examples include an axially extending baffle located above the lamp, opposite the receiving platform. When applied in a printing process to produce parts as disclosed herein, the various examples disclosed herein may reduce multi-scattering, provide heating that is more uniform across a region of the build material, improve material properties due to reduced thermal variation, achieve improved dimensional accuracy, reduce part defects, improve color accuracy when colors are used, or allow parts that are being built to be more closely spaced when building multiple parts simultaneously. Any of these benefits may make a printer more economical to operate or more desirable to use.

Referring now to the view of FIG. 1, an electronic device in accordance with the principles disclosed herein is shown. In this example, the electronic device is a printer 100, and more specifically, in this example, printer 100 is a 3D printer. Printer 100 includes a housing 102 for which a coordinate system may be defined by an x-axis, a y-axis, and a z-axis. In this example, the three axes are orthogonal with the x-axis extending lengthwise (left and right in FIG. 1), the y-axis extending widthwise (into and out of the page in FIG. 1), and the z-axis extending vertically (up and down in FIG. 1). The z-axis may also be called an elevation axis, referring to an elevation of a part that may be built by printer 100. The elevation axis extends, for example, between a receiving surface or platform and a movable heater.

In housing 102, printer 100 includes a print carriage 114 for distributing colorant, fusing agent, or multiple of these substances, a material feed mechanism 116 to deposit sequential layers of build material 117 on a receiving surface 118, a printer heater 120, and a carriage system 122. Print carriage 114 includes a print head for delivering liquid droplets. Print carriage 114, feed mechanism 116, and heater 120 are slidingly mounted to carriage system 122 to move back-and-forth parallel to the x-axis across receiving surface 118. As an example, carriage system 122 may include a guide bar and a common drive mechanism to move print carriage 114, feed mechanism 116, and heater 120 or may include separate drive mechanisms or guide bars for components 114, 116, 120 to move them together or separately. Other types of carriage systems are possible in various other examples of device 100. In some examples, a carriage system mounts print carriage 114, feed mechanism 116, and heater 120 separately. In some examples, print carriage 114, feed mechanism 116, heater 120 or combinations thereof are mounted to move along the x-axis, y-axis, or z-axis, which may include combinations of these axes. In some examples, build material 117 is powdered or granular. Heater 120 may also be called a heater assembly or fusing module. Heater 120 includes a radiant energy absorbing barrier 130 that includes a radiant energy absorbing baffle 132.

In the example of FIG. 1, receiving surface 118 is a part of a movable platform 126, disposed in a bin 124. Platform 126 is vertically adjustable along the z-axis by a drive or lift mechanism 128, and the receiving surface 118 is likewise vertically movable relative to feed mechanism 116 and heater 120. For example, lift mechanism 128 may move platform 126 vertically downward along the z-axis in increments to allow receiving surface 118 to receive sequential layers of build material or print agent that build upon the previous layers. A deposited layer may receive liquid from print carriage 114. The layer may next be heated by heater 120 passing over it. Portions of the layer may be bonded by the heat from heater 120. During the printing process, an upper or outer layer 129 of build material or print agent is a receiving surface for a subsequent layer of build material or print agent. Thus, as sequential layers of build material are added, the previous layer is a new receiving surface for the next layer. In this manner, a part being printed may be completed as a three-dimensional (3D) object.

Still referring to FIG. 1, lift mechanism 128 may move platform 126 vertically upward when preparing for the removal of a printed part or when preparing for a new print task. In some examples, as a part is built layer upon layer, platform 126 is to maintain the upper layer 129 of the build material 117 at a selected distance 134 from the heater 120 or feed mechanism 116, measured along the z-axis. Bin 124 may be for customer-installation into housing 102 or removable from housing 102 to facilitate shipping, for replacement or repair, for removal of a printed part following a print operation, or for another reason. In some examples, bin 124 with platform 126 is mounted in a separate housing. The separate housing may couple to housing 102 to form the assembly.

Figure 2:
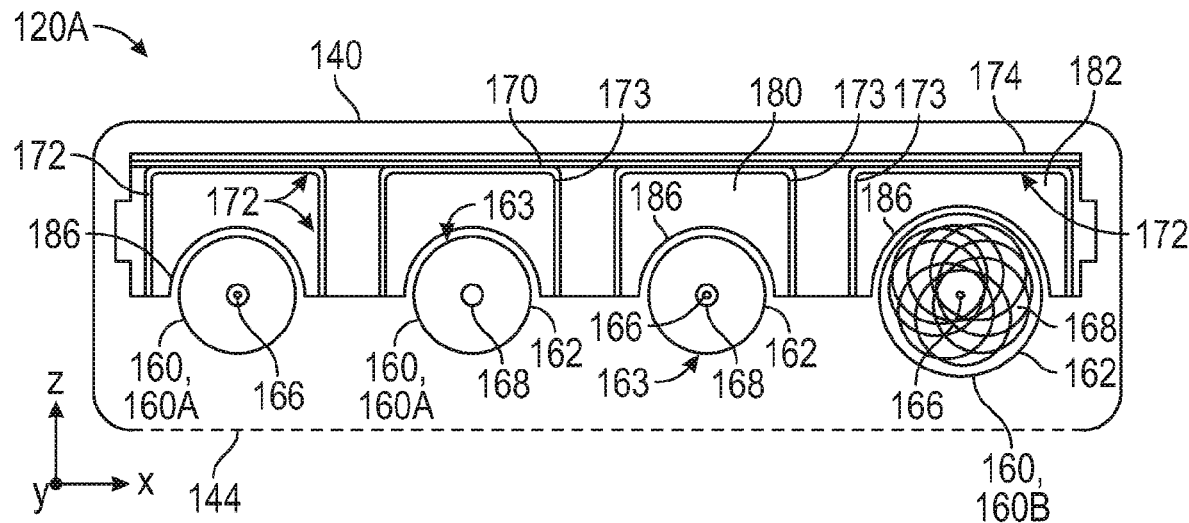
FIG. 2 shows an end view of a heater that includes a radiant barrier with baffles in accordance with various examples.
Figure 3:
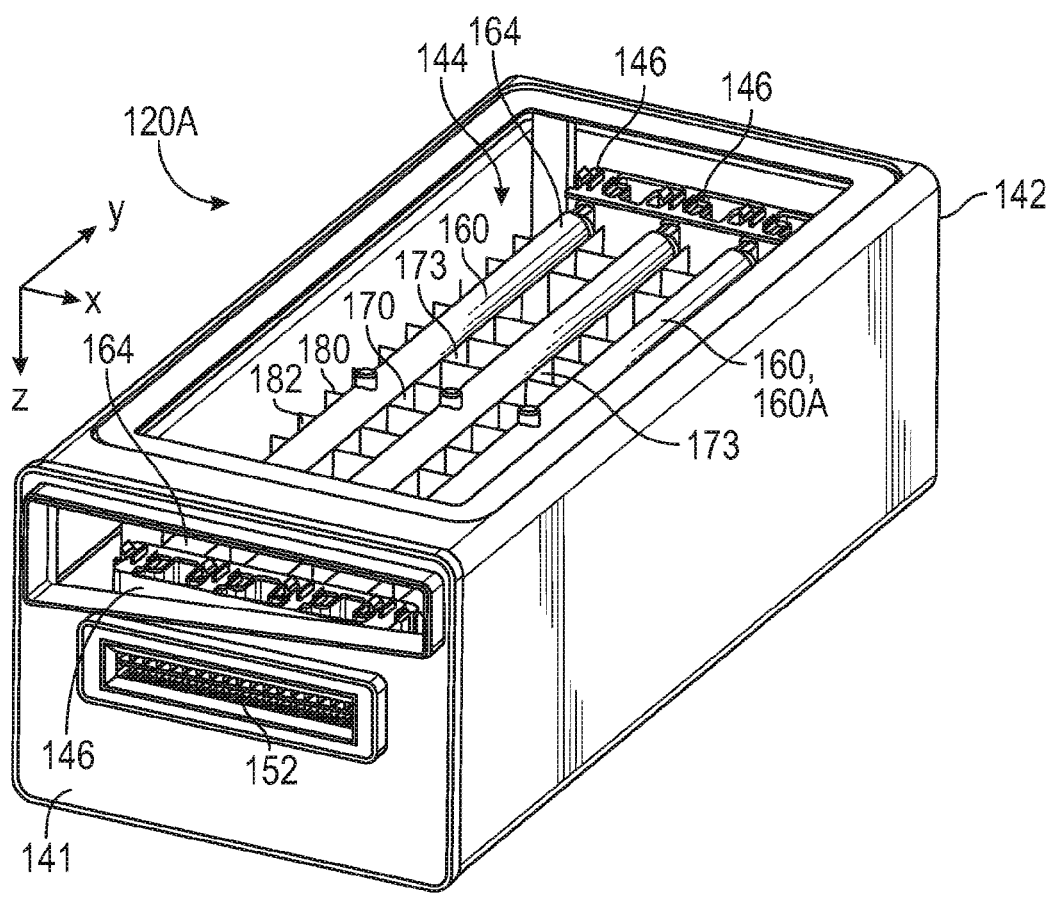
FIG. 3 shows a perspective view of the heater of FIG. 2 in accordance with various examples.

FIGS. 2 and 3 show a radiant heater 120A that is an example of the heater 120 in FIG. 1. Printer heater 120A includes a housing 140 that extends lengthwise from a first end 141 to a second end 142 and includes a transparent opening 144 located between ends 141, 142. Housing 140 includes multiple sockets 146 for receiving lamps. Transparent opening 144 includes glass, another transparent material, or is open, having no material extending across it. A set of X-Y-Z orthogonal axes are shown for heater 120A and its housing 140. In some examples, these axes correspond to the same directions as the X-Y-Z axes of FIG. 1.

Within or coupled to housing 140, heater 120A includes a plurality of lamps 160 coupled to sockets 146, a reflector 170 located behind lamps 160 with respect to opening 144, a radiant barrier 180 that includes radiant energy absorbing baffles, and a connector 152 to provide power or control signals to lamps 160. Portions of reflector 170 extend alongside lamps 160, toward opening 144. When installed in the system of FIG. 1, lamps 160 are spaced apart from receiving surface 118 and are located between radiant barrier 180 (e.g., radiant barrier 130 in FIG. 1) and the receiving surface 118. Lamps 160 and the reflector 170 are to direct radiant energy toward the receiving surface 118 and any build material 117 sitting on it. The radiant energy is to heat the build material. Barrier 180 is to absorb a portion of the radiant energy emitted by lamp 160 and to absorb a portion of the radiant energy reflected from build material 117 or receiving surface 118. Barrier 180 is to limit or prevent this absorbed energy from traveling to build material 117. At least in this manner, radiant barrier 180 is to limit an amount of radiant energy traveling toward the receiving surface 118 or build material 117. In some examples, the passive action of radiant barrier 180 makes more uniform the spatial distribution of radiant energy traveling toward receiving surface 118 or build material 117.

Figure 4:
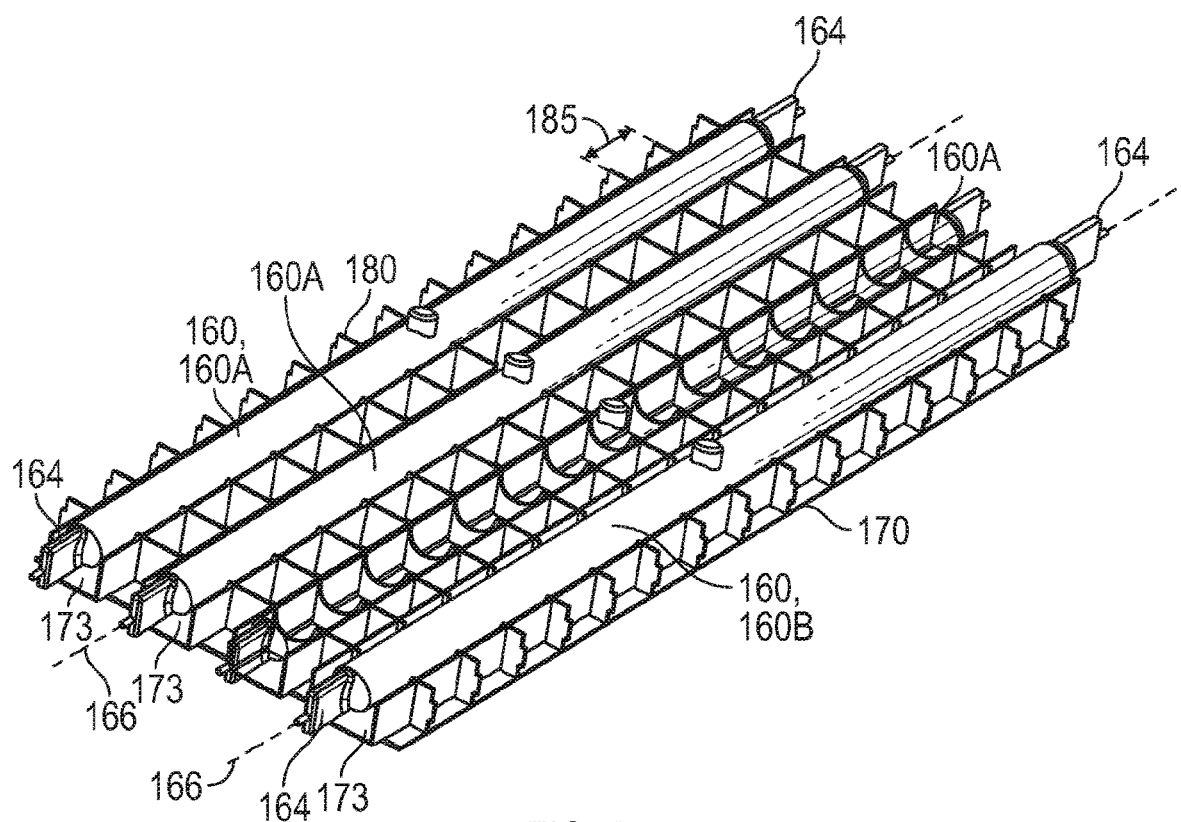
FIG. 4 shows a perspective view of the radiant barrier with baffles and the heat lamps of FIG. 3 in accordance with various examples.

Referring now to FIGS. 1, 2, and 3, lamps 160 are sources of radiant heat. A lamp 160 includes a tubular bulb 162 having a cylindrical external surface 163 and extending between first and second ends 164 along a longitudinal filament axis 166, which in this example is centrally located within tubular bulb 162. Lamp 160 includes a heater filament 168 electrically coupled through ends 164 to sockets 146 and extending along filament axis 166. Other configurations and arrangements of heat lamps, heater filaments, or sockets 146 are possible. As shown in FIGS. 2 and 4, heater 120A includes three of a first type of lamp 160A to provide a first spectrum of radiant energy and one of a second type of lamp 160B to provide a second spectrum of radiant energy. Other heater filament configurations, other types of lamps, or other quantities of lamps 160A, 160B may be included in other heater examples. Some examples have a single type of lamp or a single lamp 160. Some examples include a heater filament that is not enclosed in a bulb. In some examples, a lamp 160 includes a quartz infrared halogen heat source.

Figure 5:
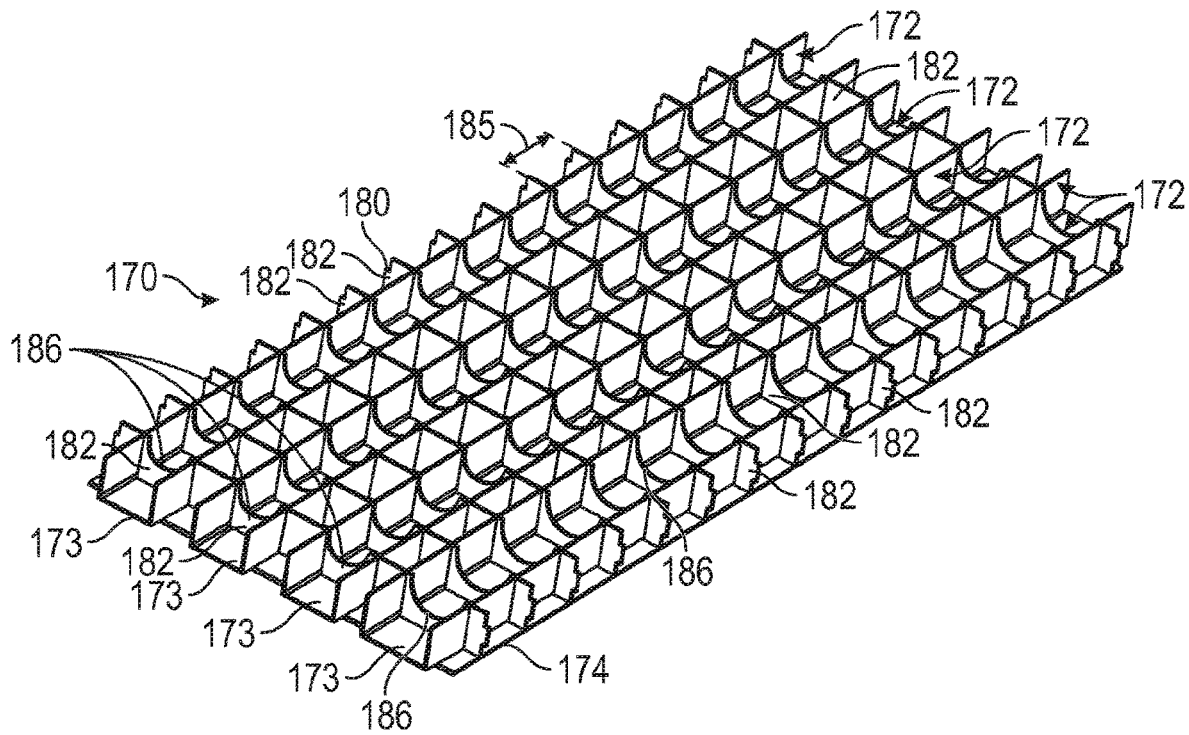
FIG. 5 shows a perspective view of the radiant barrier with baffles of FIG. 4 in accordance with various examples.
Figure 6:
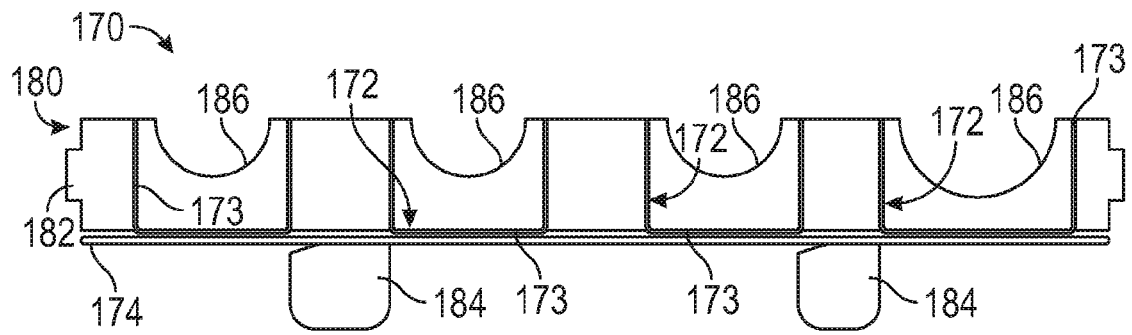
FIG. 6 shows an end view of the radiant barrier with baffles of FIG. 4 in accordance with various examples.

Referring to FIGS. 2 and 3, reflector 170 is located behind a lamp 160 with respect to opening 144. Reflector 170 extends in a first direction that is parallel to a filament axis 166 and in a second direction that is perpendicular to axis 166. Reflector 170 includes a reflective surface 172 that extends axially along and circumferentially around a portion of each lamp 160. In general, reflective surface 172 faces lamps 160 and transparent opening 144. More specific to this example, reflector 170 is an assembly that includes multiple member reflectors 173 coupled to a frame member 174. Reflectors 173 are laterally spaced apart, perpendicular to axis 166, with gaps located between neighboring reflectors 173. The lateral spacing may be uniform from one pair of neighboring reflectors 173 to another or may vary. A reflector 173 includes a rectangular channel, and the inner, reflective surface 172 of this channel includes a bottom or inner region and two side regions. In general, surface 172 is to face toward opening 144. A reflector 173 and its reflective surface 172 extend axially along and circumferentially around a portion of one of the lamps 160. FIGS. 4 to 6 provide additional views that include reflector 170. In some examples, such as those with a single lamp 160, reflector 170 includes a single member reflector 173. Thus, the terms reflector 170 and reflector 173 describe similar or equivalent components.

Referring to FIGS. 2, 5, and 6, radiant barrier 180 includes multiple lateral baffles 182, extending lengthwise at a non-zero angle with respect to filament axis 166. Baffles 182 include thin plates or beams that are to absorb radiant energy. In this example, baffles 182 extend in length perpendicular to filament axis 166. Lateral baffles 182 extend in height (or depth) towards opening 144. Lateral baffles may extend in height parallel to a z-axis for housing 140 within 15 degrees of being parallel to the z-axis (e.g., the vertical axis). Baffles are coupled to reflector 170 by connector tabs 184 and by interconnections with reflectors 173. Baffles 182 are spaced apart from one another axially by a baffle gap 185, measured along axis 166 (FIG. 4). In some examples, the baffle gap between baffles 182 varies from one pair of neighboring baffles 182 to another. A lateral baffle 182 extends laterally through the neighboring reflectors 173 and their reflective surfaces 172. Baffle 182 includes multiple recesses 186, having a recess 186 located within a reflector 173 to receive lamps 160. The recesses 186 have different diameters to accommodate the different diameters of lamps 160A, 160B. In FIG. 2, a baffle 182 extends around a portion of a lamp 160 in a circumferential direction with respect to the filament axis 166 because lamp 160 is received in a recess 186. In FIGS. 2-6, the multiple baffles 182 of radiant barrier 180 are incorporated into reflector 170 as an assembly.

Figure 7:
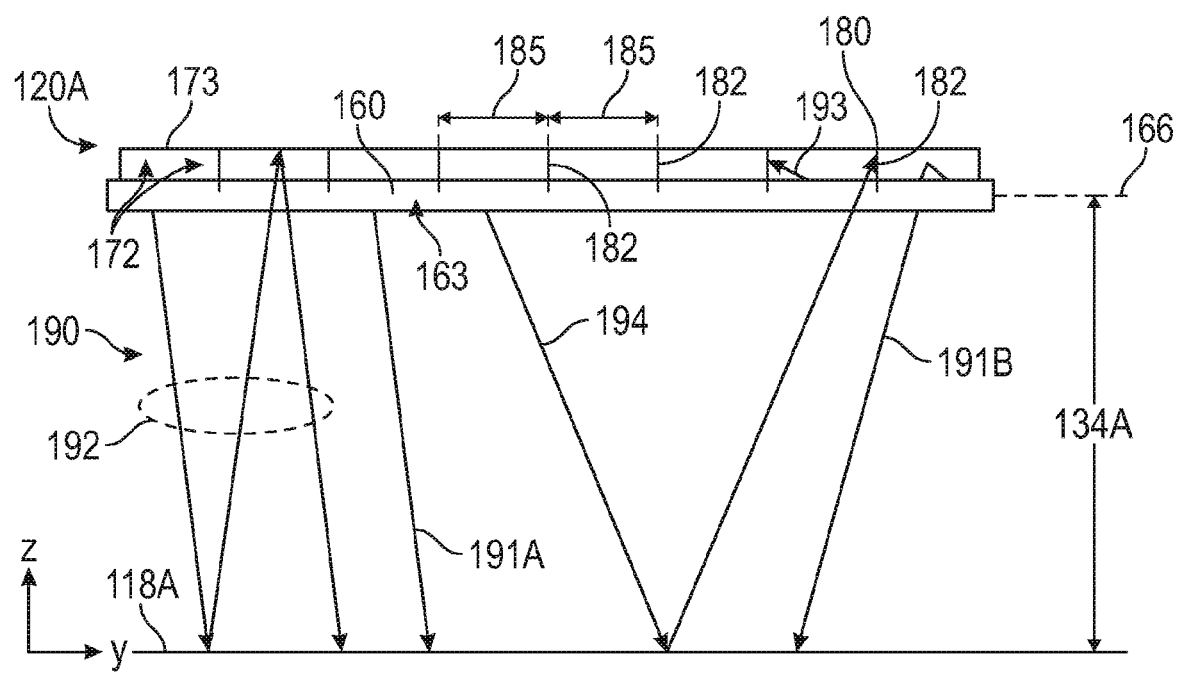
FIG. 7 shows a side view of the heater of FIG. 2 as it may operate in a printer in accordance with various examples.

FIG. 7 shows a side view of the heater 120A operating on a receiving surface 118A, which may include the surface of a movable platform or a layer of build material previously deposited or most recently deposited. Lamp 160 is spaced apart from receiving surface 118A by a selected spacing 134A, and, on average, lateral baffles 182 of radiant barrier 180 are spaced further from surface 118A, as is reflector 173 with its reflective surface 172. Thus, in this example, lamp 160 is disposed between the receiving surface 118A and the combination of radiant barrier 180 and reflector 173, as was previously described. During operation, lamp 160 emits radiant energy 190 to heat the build material. The radiant energy includes multiple ray paths or rays traveling in multiple directions from surface 163 of lamp 160. Examples of these ray paths or rays are shown and will be discussed. Rays 191A, 191B are emitted from lamp 160 and are absorbed by surface 118A, after following different paths. Ray 191A follows a direct path; whereas, ray 191B first travels to reflector 173 and is reflected down to surface 118A where it is absorbed. A ray 192 is emitted from lamp 160 toward receiving surface 118A, is reflected by surface 118A, is re-reflected by reflector 173, and returns to surface 118A to be absorbed. Thus, ray 192 is an example of re-reflection and absorption. In this example, ray 192 travels further along the x-axis before being absorbed by surface 118A than ray 191A travels before being absorbed. Other re-reflections may have more interactions with surface 118A or reflector 173. Ray 191B includes a single reflection and without a re-reflection. A ray 193 travels from an upper region of lamp 160 and impinges upon a baffle 182, which absorbs ray 193. Ray 193 is directly absorbed by radiant barrier 180 and does not reach surface 118A. A ray 194 is emitted from lamp 160 toward receiving surface 118A, is reflected by surface 118A, and is absorbed by a baffle 182. Rays 193, 194 are examples of controlled or eliminated radiation. Thus, the radiant energy absorbing barrier 180 with radiant energy absorbing baffles 182 is to control emission of radiant energy from a lamp 160 or heater filament 168 toward receiving surface 118A and to control re-reflection of radiant energy from surface 118A. In this example, eliminated ray 194 travels further along the x-axis than rays 191A, 191B, 192 travel along the x-axis before they are absorbed by receiving surface 118A. In other examples, an eliminated ray may travel a shorter distance along the x-axis than does a ray that is absorbed by receiving surface 118A.

Regarding the descriptions in this disclosure that discuss rays being absorbed or reflected, it is to be understood that in some examples, an absorption or reflection by a surface may not be 100%. Some rays that are described as being absorbed at a particular surface may be partially reflected at that surface. Likewise, some rays that are described as being reflected at a particular surface may be partially absorbed at that surface. In addition, some amount of transmission of radiant energy through a surface may be possible during some interactions with some surfaces, such as the surface of a build material.

In some examples, a radiant barrier or a radiant energy absorbing baffle is to absorb different spectrums of radiant energy emitted by multiple sources, such as lamps 160A, 160B. The emissions differences between lamps 160A, 160B may be based on having different heater filaments that include different materials or based on operating at different temperatures. In some examples, the radiant energy absorbed and controlled by a radiant barrier or a radiant energy absorbing baffle includes energy that is first absorbed by the receiving surface and is then reradiated by the receiving surface. Such re-emitted radiant energy may have a different wave length or a different spectrum of wavelengths than the absorbed radiant energy had, based on the difference in temperature of the receiving surface as compared to a higher temperature of the heater filament or the lamp surface.

Figure 8:
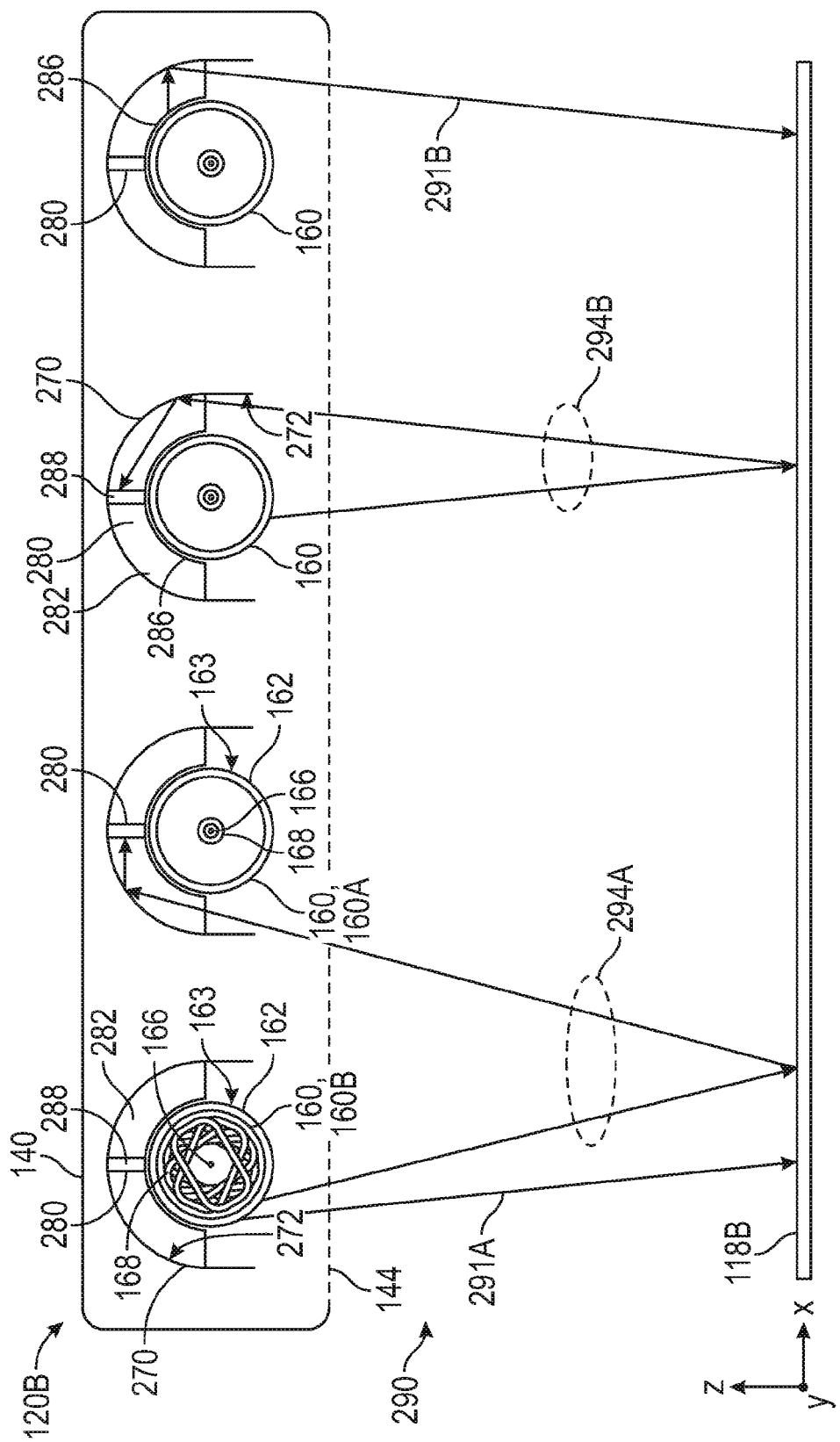
FIG. 8 shows an end view of another heater that includes a radiant barrier with baffles as it may operate in a printer in accordance with various examples.

Referring now to FIG. 8, radiant heater 120B is another example of the heater 120 in FIG. 1. Printer heater 120B includes a housing 140 with a transparent opening 144 and a set of X-Y-Z orthogonal axes. Housing 140 and the axes are as described above and shown in FIG. 3. Within or coupled to housing 140, heater 120B of FIG. 8 includes a plurality of lamps 160 coupled to sockets 146, a plurality of reflectors 270 located behind lamps 160 with respect to opening 144, and a plurality of radiant barriers 280 that includes radiant energy absorbing baffles. A radiant barrier 280 is located between a lamp 160 and a reflector 270.

Portions of reflector 270 extend alongside lamps 160, toward opening 144. When installed in the system of FIG. 1, lamps 160 are spaced apart from receiving surface 118 and are located between radiant barriers 280 (e.g., radiant barrier 130 in FIG. 1) and the receiving surface 118. Lamps 160 and the reflectors 270 are to direct radiant energy toward the receiving surface 118 and any build material 117 sitting on it. The radiant energy is to heat the build material. Barriers 280 are to absorb a portion of the radiant energy emitted by lamps 160 and to absorb a portion of the radiant energy reflected from build material 117 or receiving surface 118. Barriers 280 are to limit or prevent this absorbed energy from traveling to build material 117. At least in this manner, radiant barriers 280 are to limit an amount of radiant energy traveling toward the receiving surface 118 or build material 117. In some examples, the passive action of radiant barriers 280 makes more uniform the spatial distribution of radiant energy traveling toward receiving surface 118 or build material 117.

Continuing to reference FIG. 8, lamps 160 are as described above with reference to heater 120A. For example, a lamp 160 includes a heater filament 168 extending along a longitudinal filament axis 166 within a tubular bulb 162 that includes a cylindrical external surface 163. Heater 120B includes three of a first type of lamp 160A to provide a first spectrum of radiant energy and one of a second type of lamp 160B to provide a second spectrum of radiant energy. Other heater filament configurations or lamp configurations may be included in other examples of heater 120B.

A reflector 270 includes a concave reflective surface 272 that extends as a channel parallel to filament axis 166, and circumferentially around a portion of the corresponding lamp 160. In general, reflective surface 272 faces lamp 160 and transparent opening 144. Heater 120A includes four pairs that include a lamp 160 and a reflector 270. The pairs of lamps 160 and reflectors 270 are laterally spaced apart.

Figure 9:
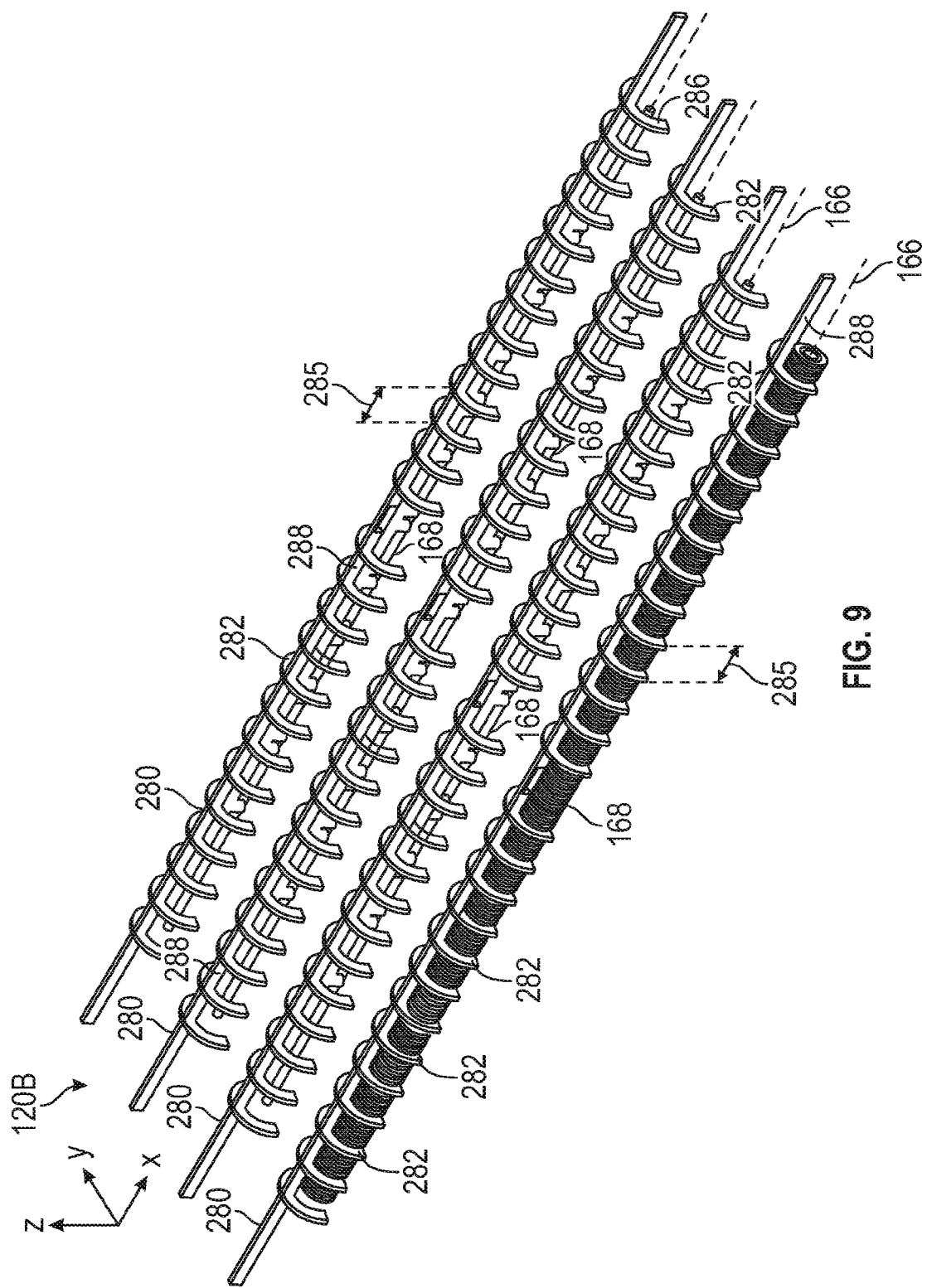
FIG. 9 shows a perspective view of the heater filaments and the radiant barrier with baffles of the heater of FIG. 8 in accordance with various examples.

FIGS. 8 and 9 show two views of the plurality of radiant barriers 280. A radiant barrier 280 includes multiple lateral baffles 282 and a longitudinal baffle 288. Baffles 282, 288 include thin plates or beams that are to absorb radiant energy. Longitudinal baffle 288 extends lengthwise parallel to filament axis 166, intersecting and coupling to lateral baffles 282 as an assembly or an integral component. As viewed in an X-Y plane, lateral baffles 282 extend lengthwise at a non-zero angle with respect to filament axis 166 and baffle 288. In the example of FIGS. 8 and 9, lateral baffles 282 extend perpendicular to axis 166. As shown most directly in FIG. 8, lateral baffles 282 extend in a curved or arched path around a lamp 160, in a circumferential direction with respect to the axis 166. In FIGS. 8 and 9, lateral baffle 282 is semicircular with an appropriately sized recess 286 to receive a lamp 160A, 160B. In general, the curvature of lateral baffles 282 and the corresponding concavity of reflective surface 272 of reflector 270 may include an arcuate or parabolic shape, or may have another shape that may be curved or angled. Baffles 282 extend in height towards opening 144, parallel to a z-axis for housing 140 or within 15 degrees of being parallel to the z-axis (e.g., the vertical axis). Baffles 282 are spaced apart from one another axially by a baffle gap 285 (FIG. 9). In some examples, the baffle gap between baffles 282 varies from one pair of neighboring baffles 282 to another.

During some examples, the lateral baffles 282 of heater 120B operate as was described for lateral baffles 182 of heater 120A, including the interactions described for ray paths or rays 191A, 191B, 192, 193, 194 of FIG. 7. The additional interactions of longitudinal baffles 288 with radiant energy from lamps 160 of heater 120B will be described with reference to FIG. 8.

FIG. 8 shows an end view of the heater 120B operating on a receiving surface 118B, which may include the surface of a movable platform or a layer of build material previously deposited or most recently deposited. During this discussion, individual lamps 160 are discussed, but it is understood that the principles that are described also apply to the other lamps 160. Lamp 160 is disposed between the receiving surface 118B and the combination of radiant barrier 280, which includes lateral baffles 282 and longitudinal baffles 288, and reflector 272. During operation, lamp 160 emits radiant energy 290 to heat the build material. The radiant energy includes multiple ray paths or rays traveling in multiple directions from surface 163 of lamp 160. Examples of these ray paths or rays are shown and will be discussed. Rays 291A, 291B are emitted from lamp 160 and are absorbed by surface 118B, after following different paths. Ray 291A follows a direct path; whereas, ray 291B first travels to reflector 270 and is reflected down to surface 118B where it is absorbed. A ray 294A is emitted from a first lamp 160 toward receiving surface 118B, is reflected by surface 118B, and is absorbed by a longitudinal baffle 288 at a second lamp 160. A ray 294B is emitted from lamp 160 toward receiving surface 118B, is reflected by surface 118B, and is absorbed by a longitudinal baffle 288 at the same lamp 160. Rays 294A, 294B are examples of controlled or eliminated radiation. Thus, a radiant energy absorbing barrier 280 with radiant energy absorbing longitudinal baffle 288 is to control emission of radiant energy from a lamp 160 or heater filament 168 toward receiving surface 118B and to control re-reflection of radiant energy from surface 118B.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:
1. A 3D printer, the 3D printer comprising:
   a heater including a lamp extended along a longitudinal axis;
   a reflector extended parallel with the longitudinal axis, wherein the reflector comprises a reflective surface positioned to direct radiant energy from the lamp toward a receiving surface to heat a build material on the receiving surface; and
   a plurality of lateral baffles integrated with the reflector and spaced apart along the longitudinal axis, wherein individual lateral baffles of the plurality of lateral baffles comprise a radiant energy absorbing plate that extends laterally through the reflective surface and is positioned to absorb at least a portion of a reflection of the radiant energy reflected from the receiving surface to prevent the portion of the reflection of the radiant energy from being re-reflected by the reflecting surface back to the receiving surface; and
   wherein the radiant energy absorbing plate extends around a portion of the lamp in a circumferential direction with respect to the longitudinal axis.
2. The 3D printer of claim 1, wherein the plurality of lateral baffles extends perpendicular to the longitudinal axis.
3. The 3D printer of claim 2, wherein the plurality of lateral baffles comprise a first baffle, wherein the 3D printer further comprises a second radiant energy absorbing baffle that extends parallel to the longitudinal axis.

4. The 3D printer of claim 1, wherein the plurality of lateral baffles are distributed parallel to the longitudinal axis.

5. The 3D printer of claim 1, comprising a feed mechanism to distribute the build material on the receiving surface, wherein the lamp is disposed between the plurality of lateral baffles and the receiving surface,
wherein the feed mechanism is to distribute sequentially a plurality of layers of a powdered or granular build material, and
wherein after distribution of a first layer of the plurality of layers, the receiving surface includes a previous layer of the plurality of layers.

6. A printer heater comprising:
a lamp extended along a longitudinal filament axis to emit radiant energy;
a reflector comprising a reflective surface positioned to direct radiant energy from the lamp toward a receiving surface to heat a build material on the receiving surface, the reflector extended parallel with the longitudinal filament axis; and
a radiant energy absorbing baffle comprising a plurality of lateral baffles disposed between the lamp and the reflector, wherein individual lateral baffles of the plurality of lateral baffles comprise a radiant energy absorbing plate that extends laterally through the reflective surface and is positioned to absorb at least a portion of a reflection of the radiant energy reflected from the receiving surface to limit re-reflection of the portion of the reflection of the radiant energy by the reflecting surface back to the receiving surface; and
wherein the plurality of lateral baffles extend around a portion of the lamp in a circumferential direction.

7. The printer heater of claim 6, wherein the radiant energy absorbing baffle includes a radiant energy absorbing first baffle extending perpendicular to the longitudinal filament axis.

8. The printer heater of claim 7, wherein the radiant energy absorbing baffle includes a radiant energy absorbing second baffle extending parallel to the longitudinal filament axis, and
wherein the radiant energy absorbing first baffle and the radiant energy absorbing second baffles are to absorb energy reflected from the receiving surface.

9. The printer heater of claim 6, wherein the radiant energy absorbing baffle includes a radiant energy absorbing longitudinal baffle extending parallel to the longitudinal filament axis, and the plurality of lateral baffles extending perpendicular to the longitudinal baffle.

10. A 3D printer comprising:
a housing;
a feed mechanism to distribute a build material on a platform that is to be disposed at a location established with respect to the housing;
a reflector spaced apart from the location for the platform;
a heater filament disposed between the reflector and the location for the platform and extending along a longitudinal filament axis, wherein the reflector comprises a reflective surface positioned to direct radiant energy from the heater filament toward the platform to heat the build material on the platform; and
a plurality of lateral baffles between the heater filament and the reflector, wherein individual lateral baffles of the plurality of lateral baffles comprise a radiant energy absorbing plate that extends laterally through the reflective surface and is positioned to absorb at least a portion of a reflection of the radiant energy reflected from the build material to prevent the portion of the reflection of the radiant energy from being re-reflected by the reflecting surface back to the platform; and
wherein the reflector and the plurality of lateral baffled extend around a portion of the heater filament in a circumferential direction.

11. The 3D printer of claim 10, wherein the 3D printer further comprises a longitudinal baffle extending parallel to the longitudinal filament axis and intersecting the plurality of lateral baffles,
wherein the longitudinal baffle is to absorb at least a second portion of the reflection of the radiant energy reflected from the build material to control re-reflection of the second portion of the reflection of radiant energy toward the platform.

12. The 3D printer of claim 1, wherein the reflector and the plurality of lateral baffles form a concave shape, and wherein the lamp is positioned within the concave shape.

13. The printer heater of claim 6, wherein the reflector and the radiant energy absorbing baffle form a concave shape, and wherein the lamp is positioned within the concave shape.

14. The 3D printer of claim 10, wherein the plurality of lateral baffles extend perpendicular to the longitudinal filament axis.

15. The 3D printer of claim 10, wherein the reflector and the plurality of lateral baffles form a concave shape, and wherein the heater filament is positioned within the concave shape.

* * * * *